(12) United States Patent
Nemoto

(10) Patent No.: US 10,118,616 B2
(45) Date of Patent: Nov. 6, 2018

(54) CONTROL APPARATUS OF VEHICLE

(71) Applicant: TOYOTA JIDOSHA KABUSHIKI KAISHA, Toyota-shi (JP)

(72) Inventor: Yusuke Nemoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 232 days.

(21) Appl. No.: 15/256,243

(22) Filed: Sep. 2, 2016

(65) Prior Publication Data

US 2017/0072953 A1    Mar. 16, 2017

(30) Foreign Application Priority Data

Sep. 15, 2015 (JP) ................................. 2015-182352

(51) Int. Cl.
*B60W 30/16* (2012.01)
*B60W 10/184* (2012.01)
(Continued)

(52) U.S. Cl.
CPC ............ *B60W 30/16* (2013.01); *B60W 10/04* (2013.01); *B60W 10/184* (2013.01);
(Continued)

(58) Field of Classification Search
CPC .... B60W 30/16; B60W 10/04; B60W 10/184; B60W 50/06; B60W 2050/0008;
(Continued)

(56) References Cited

U.S. PATENT DOCUMENTS 5,752,214 A * 5/1998 Minowa ............. B60K 31/0008
701/111
2002/0021229 A1* 2/2002 Stein .................. B60K 31/0008
340/933
(Continued)

FOREIGN PATENT DOCUMENTS

JP          4692555 B2 *  6/2011
JP        2012-25352 A    2/2012
(Continued)

*Primary Examiner* — Tuan C To
(74) *Attorney, Agent, or Firm* — Oblon, McClelland, Maier & Neustadt, L.L.P.

(57) ABSTRACT

A control apparatus of a vehicle for causing an own vehicle to travel following a preceding vehicle calculates a requested acceleration of the own vehicle on the basis of a feedback requested acceleration to maintain an inter-vehicle distance at a target distance and a feedforward requested acceleration to cause the own vehicle to travel following the preceding vehicle. The apparatus calculates the feedforward requested acceleration on the basis of information on an acceleration of the preceding vehicle sent from the preceding vehicle through a wireless communication. The apparatus sets the feedforward requested acceleration to zero when a vehicle travel stabilization control is executed in the preceding vehicle to control a friction braking force applied to at least one of vehicle wheels of the preceding vehicle to stabilize a travel of the preceding vehicle, and the feedforward requested acceleration is larger than zero.

8 Claims, 6 Drawing Sheets

(51) Int. Cl.
    *B60W 10/04*    (2006.01)
    *B60W 30/045*   (2012.01)
    *B60W 50/06*    (2006.01)
    *G08G 1/00*     (2006.01)
    *B60W 50/00*    (2006.01)

(52) U.S. Cl.
    CPC .............. *B60W 50/06* (2013.01); *G08G 1/22*
        (2013.01); *B60W 2050/0008* (2013.01); *B60W*
        *2050/0012* (2013.01); *B60W 2550/302*
        (2013.01); *B60W 2550/308* (2013.01); *B60W*
        *2550/408* (2013.01); *B60W 2720/106*
        (2013.01)

(58) Field of Classification Search
    CPC ... B60W 2050/0012; B60W 2550/302; B60W
        2550/308; B60W 2550/408; B60W
        2770/106; G08G 1/22
    See application file for complete search history.

(56) References Cited

U.S. PATENT DOCUMENTS

| | | | | |
|---|---|---|---|---|
| 2002/0173896 A1* | 11/2002 | Ishizu | ................ | B60K 31/0008 701/96 |
| 2009/0055068 A1* | 2/2009 | Osaki | .................... | B60K 28/16 701/87 |
| 2009/0076699 A1* | 3/2009 | Osaki | ........................ | B60T 7/22 701/78 |
| 2010/0198478 A1* | 8/2010 | Shin | ...................... | B60W 10/06 701/96 |
| 2010/0299044 A1* | 11/2010 | Miyake | ................ | B62K 11/007 701/96 |
| 2011/0010094 A1* | 1/2011 | Simon | ................... | B60W 30/16 701/301 |
| 2013/0080019 A1* | 3/2013 | Isaji | ...................... | B60W 30/16 701/96 |
| 2013/0124064 A1 | 5/2013 | Nemoto | | |
| 2014/0107867 A1* | 4/2014 | Yamashiro | ............... | G08G 1/22 701/2 |
| 2015/0217778 A1* | 8/2015 | Fairgrieve | ........... | B60W 50/082 701/37 |
| 2017/0053534 A1* | 2/2017 | Lokesh | ............... | B60W 30/165 |

FOREIGN PATENT DOCUMENTS

| | | | |
|---|---|---|---|
| JP | 4998091 B2 | * | 8/2012 |
| JP | 2015-051716 A | | 3/2015 |
| KR | 101305196 B1 | * | 9/2013 |

\* cited by examiner

CONTROL APPARATUS OF VEHICLE

CROSS-REFERENCE TO RELATED APPLICATIONS

This application is based upon and claims the benefit of priority from Japanese Patent Application No. 2015-182352, filed on Sep. 15, 2015, the entire contents of which are incorporated herein by reference in entirety.

BACKGROUND

Technical Field

The present application relates to a control apparatus of a vehicle for controlling an acceleration including a deceleration of an own vehicle to cause the own vehicle to travel following a preceding vehicle.

Description of the Related Art

A control apparatus of a vehicle that controls an acceleration of an own vehicle to cause the own vehicle to travel following a preceding vehicle is described in JP 2015-51716 A. This control apparatus (hereinafter, will be referred to as "the related art apparatus") is configured to acquire a distance between the own vehicle and the preceding vehicle as an inter-vehicle distance and a traveling speed of the own vehicle as an own vehicle speed using sensors of the own vehicle and acquire a requested acceleration information of the preceding vehicle from the preceding vehicle through a wireless communication.

The related art apparatus acquires an inter-vehicle time by dividing the acquired inter-vehicle distance by the acquired own vehicle speed and calculates a feedback requested acceleration which is an acceleration of the own vehicle requested for making the inter-vehicle time correspond to a target inter-vehicle time corresponding to a target value of the inter-vehicle time on the basis of a difference between the inter-vehicle time and the target inter-vehicle time. Further, the related art apparatus calculates a feedforward requested acceleration which is an acceleration of the own vehicle requested for causing the own vehicle to travel following the preceding vehicle on the basis of the acquired requested acceleration information of the preceding vehicle.

Lastly, the related art apparatus sets a total value of the feedback and feedforward requested accelerations as a requested acceleration of the own vehicle and accelerates or decelerates the own vehicle to achieve the requested acceleration.

SUMMARY

The preceding vehicle may send to the own vehicle as the requested acceleration information of the preceding vehicle, a requested acceleration calculated on the basis of an operation amount of an acceleration pedal (an acceleration operation element) and an operation amount of a brake pedal (a brake operation element) and an actual acceleration of the preceding vehicle calculated on the basis of a vehicle wheel speed of the preceding vehicle. In this case, the related art apparatus calculates a feedforward requested acceleration on the basis of the requested acceleration and the actual acceleration sent from the preceding vehicle through the wireless communication.

In this regard, a vehicle includes a vehicle travel stabilization control device. For example, as a vehicle travel stabilization control executed by the vehicle travel stabilization control device, there are an anti-lock brake control for preventing vehicle wheels from being locked to stabilize the vehicle during a braking of the vehicle, a traction control for preventing driving wheels of the vehicle from being slipped or idled to stabilize the vehicle during an acceleration of the vehicle, for example, at a start of a travel of the vehicle, a vehicle behavior stabilization control for preventing the vehicle from being sideslipped to stabilize the vehicle during a turning travel of the vehicle and the like.

When at least one of the traction control and the vehicle behavior stabilization control is executed in the preceding vehicle, a friction braking force is applied to at least one of the vehicle wheels of the preceding vehicle and therefore, even when the operation amount of the acceleration pedal of the preceding vehicle increases, the actual acceleration of the preceding vehicle may not correspond to a value depending on the operation amount of the acceleration pedal. On the other hand, when at least one of the traction control and the vehicle behavior stabilization control is executed in the preceding vehicle and the operation amount of the acceleration pedal of the preceding vehicle increases, the preceding vehicle sends to the own vehicle as the requested acceleration of the preceding vehicle, a requested acceleration calculated on the basis of the increased operation amount of the acceleration pedal of the preceding vehicle.

In this case, if the feedforward requested acceleration is calculated on the basis of the requested acceleration sent from the preceding vehicle and the requested acceleration of the own vehicle is set on the basis of the calculated feedforward requested acceleration, the own vehicle is accelerated at an acceleration depending on the thus-set requested acceleration and then, the inter-vehicle distance may decrease while the preceding vehicle is not accelerated at an acceleration generally equal to the requested acceleration of the preceding vehicle. In this case, the own vehicle cannot travel following the preceding vehicle accurately.

Further, even when the vehicle wheel speed of the preceding vehicle is increased due to an elimination of the locked state of at least one of the vehicle wheels of the preceding vehicle by the anti-lock brake control executed in the preceding vehicle, the preceding vehicle is not accelerated. On the other hand, when the vehicle wheel speed is increased due to the anti-lock brake control executed in the preceding vehicle, the preceding vehicle sends to the own vehicle as the actual acceleration of the preceding vehicle, an actual acceleration calculated on the basis of the increased vehicle wheel speed of the preceding vehicle.

In this case, if the feedforward requested acceleration is calculated on the basis of the actual acceleration sent from the preceding vehicle and the requested acceleration of the own vehicle is set on the basis of the calculated feedforward requested acceleration, the own vehicle may be accelerated and thus, the inter-vehicle distance may decrease while the preceding vehicle is not accelerated. In this case, the own vehicle cannot travel following the preceding vehicle accurately.

The present disclosure has been made for solving the above-described problem. therefore, one of objects of the present disclosure is to provide a control apparatus of a vehicle which can cause the own vehicle to travel following the preceding vehicle accurately while preventing the inter-vehicle distance from decreasing unnecessarily even when the vehicle travel stabilization control is executed in the preceding vehicle.

A control apparatus according to the present disclosure includes an inter-vehicle distance detection device that detects an inter-vehicle distance between an own vehicle and a communicating preceding vehicle; a wireless communication device that acquires communicating preceding vehicle information including at least one of requested acceleration information on a requested acceleration of the communicating preceding vehicle and actual acceleration information on an actual acceleration of the communicating preceding vehicle from the communicating preceding vehicle through a wireless communication; and an acceleration control device that controls an acceleration of the own vehicle such that the acceleration of the own vehicle corresponds to a requested acceleration of the own vehicle.

The acceleration control device includes first to third means for calculating. The first calculation means is configured to calculate a feedback requested acceleration which is an acceleration requested by the own vehicle to maintain the inter-vehicle distance at a target inter-vehicle distance.

The second calculation means is configured to calculate a feedforward requested acceleration which is an acceleration requested by the own vehicle to cause the own vehicle to travel following the communicating preceding vehicle on the basis of at least one of the requested acceleration information and the actual acceleration information.

The third calculation means is configured to calculate a requested acceleration of the own vehicle on the basis of the feedback requested acceleration and the feedforward requested acceleration.

The acceleration control device is configured to execute a following travel control that causes the own vehicle to travel following the communicating preceding vehicle by controlling the acceleration of the own vehicle such that the acceleration of the own vehicle corresponds to the requested acceleration of the own vehicle calculated by the third calculation means.

According to the above-described following travel control, it is possible to cause the own vehicle to travel following the communicating preceding vehicle at an acceleration depending on the requested acceleration or the actual acceleration of the communicating preceding vehicle such that the inter-vehicle distance is maintained at a predetermined distance (the target inter-vehicle distance).

The third calculation means is configured to set the feedforward requested acceleration to zero when the communicating preceding vehicle information includes information indicating that a vehicle travel stabilization control is executed to control a friction braking force applied to at least one of vehicle wheels of the communicating preceding vehicle from a friction braking device of the communicating preceding vehicle to stabilize a traveling of the communicating preceding vehicle and indicating that the feedforward requested acceleration is larger than zero.

For example, when a control apparatus of the communicating preceding vehicle does not execute a control to cause the communicating preceding vehicle to travel following a vehicle traveling in front of the communicating preceding vehicle, the requested acceleration of the communicating preceding vehicle is a requested acceleration calculated by the control apparatus of the communicating preceding vehicle on the basis of an operation amount of an acceleration operation element of the communicating preceding vehicle and an operation amount of a brake operation element of the communicating preceding vehicle.

In addition, for example, when the control apparatus of the communicating preceding vehicle executes the control to cause the communicating preceding vehicle to travel following the vehicle traveling in front of the communicating preceding vehicle, the requested acceleration of the communicating preceding vehicle is a requested acceleration of the communicating preceding vehicle calculated by the control apparatus of the communicating preceding vehicle on the basis of acceleration information on an acceleration of the vehicle traveling in front of the communicating preceding vehicle acquired from the vehicle traveling in front of the communicating preceding vehicle through the wireless communication by the control apparatus of the communicating preceding vehicle.

In addition, the vehicle travel stabilization control includes, for example, at least one of a control to adjust a friction braking force applied to at least one of the vehicle wheels of the communicating preceding vehicle determined as a vehicle wheel locked during a braking of the communicating preceding vehicle to eliminate a locked state of the vehicle wheel (the anti-lock brake control); a control to apply the friction braking force to at least one of driving wheels of the communicating preceding vehicle determined as a driving wheel slipped during an acceleration of the communicating preceding vehicle to eliminate a slipped state of the driving wheel (the traction control); and a control to apply the friction braking force to at least one of the vehicle wheels of the communicating preceding vehicle to eliminate a sideslipped state of the communicating preceding vehicle determined to be generated during a turning travel of the communicating preceding vehicle (the vehicle behavior stabilization control).

According to the control apparatus of the present disclosure, the feedforward requested acceleration is set to zero, that is, the feedforward requested acceleration is limited to a value equal to or smaller than zero when the vehicle travel stabilization control is executed in the communicating preceding vehicle. Thus, when the vehicle travel stabilization control is executed in the communicating preceding vehicle and thus, the communicating preceding vehicle is unlikely to be accelerated at the acceleration depending on the requested acceleration of the communicating preceding vehicle, the feedforward requested acceleration is set to a value equal to or smaller than zero. Therefore, the acceleration of the own vehicle derived from the feedforward requested acceleration does not occur when the communicating preceding vehicle is not accelerated. As a result, the own vehicle can be caused to travel following the communicating preceding vehicle accurately.

In the above description, for facilitating understanding of the present disclosure, elements of the present disclosure corresponding to elements of an embodiment described later are denoted by reference symbols used in the description of the embodiment accompanied with parentheses. However, the elements of the present disclosure are not limited to the elements of the embodiment defined by the reference symbols. The other objects, features and accompanied advantages of the present disclosure can be easily understood from the description of the embodiment of the present disclosure along with the drawings.

DESCRIPTION OF THE ILLUSTRATIVE EMBODIMENTS

Below, a control apparatus of a vehicle according to an embodiment of the present disclosure will be described with reference to the drawings. Hereinafter, the control apparatus according to the embodiment will be referred to as "the embodiment control apparatus". In the description, the drawings and the claims, the own vehicle is a subject vehicle, to which the present disclosure is applied and the preceding vehicle is a vehicle which travels in front of the own vehicle, is acquired by a sensor installed in the own vehicle as described later and outputs information permitted to be used by the control apparatus of the own vehicle to change a control for causing the own vehicle to travel.

Figure 1:
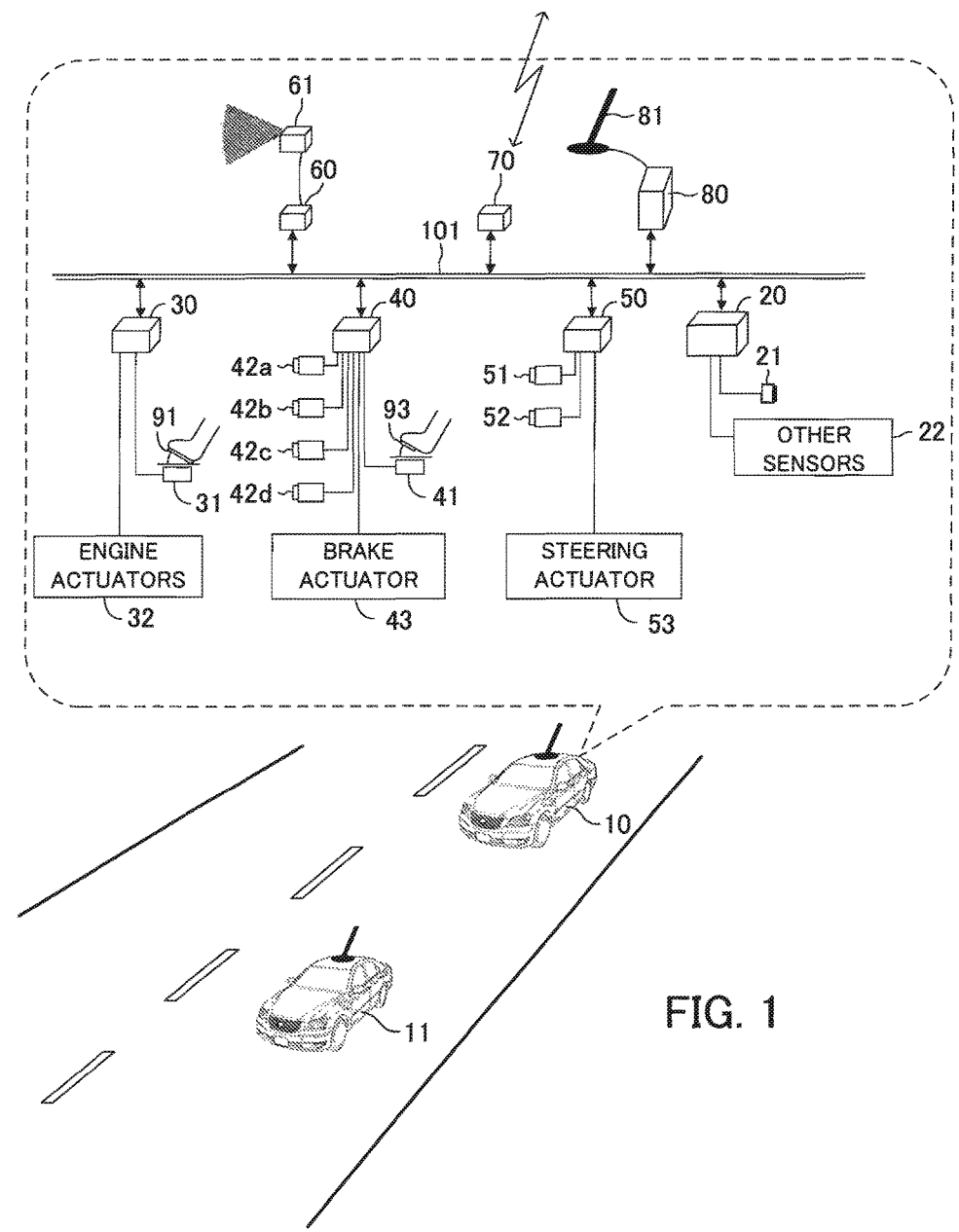
FIG. 1 shows a general configuration view of a control apparatus of a vehicle according to an embodiment of the present disclosure and the vehicle installed with the control apparatus.

As shown in FIG. 1, the embodiment control apparatus is applied to a vehicle (an own vehicle) 10. The own vehicle 10 comprises a vehicle control ECU 20, an engine control ECU 30, an acceleration pedal operation amount sensor 31, a brake control ECU 40, a brake pedal operation amount sensor 41, vehicle wheel speed sensors 42a to 42d, a steering control ECU 50, a yaw rate sensor 51, a steering angle sensor 52, a sensor ECU 60, an own vehicle sensor 61, a GPS device 70, a wireless communication control ECU 80 and a wireless antenna 81. A preceding vehicle 11 has the same configuration as the configuration of the own vehicle 10.

The vehicle control ECU 20 can send data to and receive data from, that is, can communicate with the engine control ECU 30, the brake control ECU 40, the steering control ECU 50, the sensor ECU 60, the GPS device 70 and the wireless communication control ECU 80 via a sensor system CAN (i.e., a sensor system Controller Area Network) 101. Each of the ECUs is an electronic control unit and includes, as a main part, a microcomputer including a CPU, a ROM, a RAM, an interface and the like. The CPU is configured or programmed to execute instructions (or programs) stored in a memory (i.e., the ROM) to realize various functions described later.

The vehicle control ECU 20 is electrically connected to a cooperative following travel control request switch 21 which is an ON-OFF switch and various sensors 22. Hereinafter, the cooperative following travel control request switch 21 will be referred to as "the CACC switch 21".

When the CACC switch 21 is set to an ON-position by an occupant (in particular, a driver) of the own vehicle 10, a start of an execution of a cooperative following travel control described later is requested by the vehicle control ECU 20. The cooperative following travel control includes an inter-vehicle distance control described later.

The engine control ECU 30 is configured or programmed to acquire detection signals from sensors that detect various engine operation state amounts, respectively. In particular, the engine control ECU 30 is electrically connected to the acceleration pedal operation amount sensor 31.

The acceleration pedal operation amount sensor 31 detects an operation amount Accp of an acceleration pedal 91 or an acceleration operation element 91 and outputs a detection signal expressing the operation amount Accp to the engine control ECU 30. The engine control ECU 30 is configured or programmed to acquire the acceleration pedal operation amount Accp on the basis of the detection signal, calculate or acquire a requested acceleration Gj on the basis of the acquired acceleration pedal operation amount Accp and store the calculated requested acceleration Gj in the RAM of the engine control ECU 30. It should be noted that the engine control ECU 30 may be configured or programmed to calculate the requested acceleration Gj on the basis of a traveling speed SPDj of the own vehicle 10 acquired as described later and an engine speed NE. Hereinafter, the traveling speed SPDj will be referred to as "the own vehicle speed SPDj".

Further, engine actuators 32 including a throttle valve actuator are electrically connected to the engine control ECU 30. The engine control ECU 30 is configured or programmed to activate the engine actuators 32 to change a torque generated by the engine of the own vehicle 10 such that an acceleration of the own vehicle 10 approaches the requested acceleration Gj when the requested acceleration Gj of the own vehicle 10 is a positive value, that is, when the acceleration of the own vehicle 10 is requested.

The brake control ECU 40 is configured or programmed to acquire detection signals from sensors that detect various vehicle operation state amounts. In particular, the brake control ECU 40 is electrically connected to the brake pedal operation amount sensor 41 and the vehicle wheel speed sensors 42a to 42d.

The brake pedal operation amount sensor 41 detects an operation amount Brkp of a brake pedal 93 or a brake operation element 93 and outputs a signal expressing the operation amount Brkp to the brake control ECU 40. Hereinafter, the operation amount Brkp will be referred to as "the brake pedal operation amount Brkp". The brake control ECU 40 is configured or programmed to acquire the brake pedal operation amount Brkp on the basis of the detection signal sent from the brake pedal operation amount sensor 41, calculate or acquire the requested acceleration Gj including the requested deceleration on the basis of the acquired brake pedal operation amount Brkp and store the calculated requested acceleration Gj in the RAM of the brake control ECU 40. It should be noted that the brake control ECU 40 may be configured or programmed to calculate the requested acceleration Gj on the basis of the own vehicle speed SPDj acquired as described later.

The vehicle wheel speed sensors 42a to 42d are provided on the respective vehicle wheels of the own vehicle 10. The vehicle wheel speed sensors 42a to 42d detect vehicle wheel rotation speeds ωa to ωd of the vehicle wheels, respectively and output detection signals expressing the vehicle wheel rotation speeds ωa to ωd, respectively to the brake control ECU 40.

The brake control ECU 40 is configured or programmed to acquire the vehicle wheel rotation speeds ωa to ωd on the basis of the detection signals and store the acquired vehicle wheel rotation speeds ωa to ωd in the RAM of the brake control ECU 40.

Further, the brake control ECU 40 is configured or programmed to calculate or acquire an average value ωave of the acquired vehicle wheel rotation speeds ωa to ωd (ωave=(ωa+ωb+ωc+ωd)/4) and store the calculated average value ωave as the own vehicle speed SPDj of the own vehicle 10 in the RAM of the brake control ECU 40. Hereinafter, the average value ωave will be referred to as "the average vehicle wheel rotation speed ωave".

Alternatively, the brake control ECU 40 may be configured or programmed to acquire the own vehicle speed SPDj on the basis of a detection signal output from a sensor that detects a rotation speed of a propeller shaft of the own vehicle 10 in place of acquiring the average vehicle wheel rotation speed ωave as the own vehicle speed SPDj.

Further, the brake control ECU 40 is configured or programmed to calculate an amount of a change of the acquired own vehicle speed SPDj per minute unit time, that is, calculate or acquire a time derivative value of the own vehicle speed SPDj as an actual acceleration Gaj (=dSPDj/dt) and store the calculated actual acceleration Gaj in the RAM of the brake control ECU 40.

Further, a brake actuator 43 of a friction braking device or the like is electrically connected to the brake control ECU 40. The brake control ECU 40 is configured or programmed to activate the brake actuator 43 to generate friction braking forces at the vehicle wheels of the own vehicle 10, respectively such that the deceleration of the own vehicle 10 approaches the requested acceleration Gj corresponding to the requested deceleration when the requested acceleration Gj of the own vehicle 10 is a negative value, that is, when the deceleration of the own vehicle 10 is requested.

The brake control ECU 40 is programmed or configured to execute an anti-lock brake control for adjusting the friction braking force applied to at least one of the vehicle wheels determined as a vehicle wheel locked during a braking of the own vehicle 10 to eliminate the locked state of the vehicle wheel, thereby to stabilize the own vehicle 10. In particular, the brake control ECU 40 calculates or acquires a slip rate RSD on the basis of the average vehicle wheel speed ωave stored in the RAM of the brake control ECU 40 and each vehicle wheel speed ωn which corresponds to each of the vehicle wheel speeds ωa to ωd (RSD=(ωave−ωn)/ωave).

When the calculated slip rate RSD of any of the vehicle wheels is equal to or larger than a predetermined control start threshold RSDstart, the brake control ECU 40 starts to execute the anti-lock brake control to reduce the friction braking force applied to the vehicle wheel having the calculated slip rate RSD equal to or larger than the predetermined control start threshold RSDstart. Thereby, the slip rate RSD of the vehicle wheel having the calculated slip rate RSD equal to or larger than the predetermined control start threshold RSDstart, is reduced. Hereinafter, the vehicle wheel having the calculated slip rate RSD equal to or larger than the predetermined control start threshold RSDstart, will be referred to as "the vehicle wheel to be controlled".

Then, when the slip rate RSD of the vehicle wheel to be controlled becomes equal to or smaller than a predetermined control end threshold RSDend, the brake control ECU 40 terminates the execution of the anti-lock brake control and increases the friction braking force applied to the vehicle wheel to be controlled.

Further, the brake control ECU 40 is programmed or configured to execute a traction control for applying the friction braking force to at least one of driving wheels of the own vehicle 10 determined as a driving wheel slipped or idled during the acceleration of the own vehicle 10, for example, at a start of the travel of the own vehicle 10 to eliminate the slipped state of the driving wheel, thereby to stabilize the own vehicle 10. In particular, the brake control ECU 40 calculates or acquires a slip rate RSA on the basis of the average vehicle wheel speed ωave stored in the RAM of the brake control ECU 40 and each vehicle wheel speed ωn which corresponds to each of the vehicle wheel speeds ωa and ωb of the driving wheels, respectively (RSA=(ωn−ωave)/ωn).

When the calculated slip rate RSA of at least one of the driving wheels is equal to or larger than a predetermined control start threshold RSAstart, the brake control ECU 40 starts to execute the traction control to apply a predetermined friction braking force to the driving wheel having the calculated slip rate RSA equal to or larger than the predetermined control start threshold RSAstart. Thereby, the slip rate RSA of the driving wheel having the calculated slip rate RSA equal to or larger than the predetermined control start threshold RSAstart, is reduced. Hereinafter, the driving wheel having the calculated slip rate RSA equal to or larger than the predetermined control start threshold RSAstart, will be referred to as "the driving wheel to be controlled".

Then, when the slip rate RSA of the driving wheel to be controlled becomes equal to or smaller than a predetermined control end threshold RSAend, the brake control ECU 40 terminates the execution of the traction control and thus, stops applying the friction braking force to the driving wheel to be controlled.

Further, the brake control ECU 40 is programmed or configured to execute a vehicle behavior stabilization control for applying the friction braking force to at least one of the vehicle wheels of the own vehicle 10 to eliminate a sideslipped state of the own vehicle 10, thereby to stabilize the own vehicle 10 when it is determined that the sideslipped state occurs in the own vehicle 10 during a turning travel of the own vehicle 10. In particular, when a slip angle θslip of the own vehicle 10 is equal to or larger than a predetermined slip angle θslipth and a slip angle speed ωslip of the own vehicle 10 is equal to or larger than a predetermined slip angle speed ωslipth, it can be determined that a strong slidslip occurs in the rear wheels of the own vehicle 10.

Accordingly, the brake control ECU 40 calculates or acquires a slip angle θslip of the own vehicle 10 and a slip angle speed ωslip of the own vehicle 10 on the basis of a yaw rate δ stored in the RAM of the steering control ECU 50 as described later.

When the calculated slip angle θslip is equal to or larger than the predetermined slip angle θslipth and the calculated slip angle speed ωslip is equal to or larger than the predetermined slip angle speed ωslipth, the brake control ECU 40 starts to execute the vehicle behavior stabilization control to apply the friction braking force to a front wheel outside with respect to the turning travel of the own vehicle 10. Thereby, the slip angle θslip of the own vehicle 10 and the slip angle speed ωslip are reduced. Hereinafter, the front wheel outside with respect to the turning travel of the vehicle will be referred to as "the front wheel to be controlled".

When the slip angle θslip of the own vehicle 10 becomes smaller than the predetermined slip angle θslipth or the slip angle speed ωslip of the own vehicle 10 becomes smaller than the predetermined slip angle speed ωslipth, the brake control ECU 40 terminates the execution of the vehicle behavior stabilization control and thus, stops applying the friction braking force to the front wheel to be controlled.

Further, when a difference dδ between the actual yaw rate δ and a target yaw rate δtgt (dδ=δtgt−δ) is a positive value and an absolute value of the difference dδ is equal to or larger than a predetermined threshold dδth, it can be determined that a strong sideslip occurs in the front wheels of the own vehicle 10. Hereinafter, the difference dδ will be referred to as "the yaw rate difference dδ".

The brake control ECU 40 acquires a steering angle θ and the actual yaw rate δ of the own vehicle 10 both stored in the RAM of the steering control ECU 50. In addition, the brake control ECU 40 calculates or acquires the target yaw rate δtgt on the basis of the own vehicle speed SPDj stored in the RAM of the brake control ECU 40 and the acquired steering angle θ.

Then, the brake control ECU 40 calculates or acquires the yaw rate difference dδ on the basis of the calculated target yaw rate δtgt and the actual yaw rate δ. When the yaw rate difference dδ is a positive value and the absolute value of the yaw rate difference dδ is equal to or larger than the predetermined threshold dδth, the brake control ECU 40 starts to execute the vehicle behavior stabilization control to apply the friction braking force to the right and left rear wheel and the front wheel to be controlled and sends to the engine control ECU 30, a signal for requesting the decreasing of driving force applied to the driving wheels. Thereby, the yaw rate difference dδ decreases. Hereinafter, the right and left rear wheels and the front wheel to be controlled will be collectively referred to as "the front and rear wheels to be controlled".

Thereafter, when the yaw rate difference dδ becomes a negative value or when the yaw rate difference dδ is a positive value and the absolute value of the yaw rate difference dδ becomes smaller than the predetermined threshold dδth, the brake control ECU 40 terminates the execution of the vehicle behavior stabilization control and thus, stops applying the friction braking force to the front and rear wheels to be controlled and stops sending the signal for requesting the decreasing of the driving force applied to the driving wheels.

The brake control ECU 40 sends to the vehicle control ECU 20, a vehicle travel stabilization control signal S which indicates whether or not at least one of the anti-lock brake control, the traction control and the vehicle behavior stabilization control is executed. Hereinafter, the anti-lock brake control, the traction control and the vehicle behavior stabilization control will be referred to as "the vehicle travel stabilization control", respectively.

When at least one of the vehicle travel stabilization controls is executed, the brake control ECU 40 sends to the vehicle control ECU 20 as the vehicle travel stabilization control signal S, a signal Sv which indicates that at least one of the vehicle travel stabilization controls is executed. On the other hand, when the vehicle travel stabilization controls are not executed, the brake control ECU 40 sends to the vehicle control ECU 20 as the vehicle travel stabilization control signal S, a signal Sn which indicates that the vehicle travel stabilization controls are not executed.

The steering control ECU 50 is configured or programmed to acquire detection signals from sensors that detects various vehicle operation state amounts, respectively. In particular, the steering control ECU 50 is electrically connected to the yaw rate sensor 51 and the steering angle sensor 52.

The yaw rate sensor 51 detects the yaw rate δ of the own vehicle 10 and outputs a detection signal indicating the detected yaw rate δ to the steering control ECU 50. The steering control ECU 50 acquires the yaw rate δ of the own vehicle 10 on the basis of the detection signal and stores the acquired yaw rate δ in the RAM of the steering control ECU 50.

The steering angle sensor 52 detects the steering angle θ of the steering wheel of the own vehicle 10 and outputs a detection signal indicating the detected steering angle θ to the steering control ECU 50. The steering control ECU 50 acquires the steering angle θ of the steering wheel of the own vehicle 10 on the basis of the detection signal and stores the acquired steering angle θ in the RAM of the steering control ECU 50.

Further, a steering actuator 53 such as a motor of an electric power steering device is electrically connected to the steering control ECU 50.

The sensor ECU 60 is electricaly connected to the own vehicle sensor 61. The own vehicle sensor 61 is a millimeter wave radar sensor. The own vehicle sensor 61 outputs a millimeter wave ahead of the own vehicle 10. The millimeter wave is reflected by the preceding vehicle 11. The own vehicle sensor 61 receives this reflected millimeter wave.

The sensor ECU 60 is configured or programmed to detect the preceding vehicle 11 traveling immediately in front of the own vehicle 10 on the basis of the reflected millimeter wave received by the own vehicle sensor 61. Further, the sensor ECU 60 is configured or programmed to acquire a difference dSPD between the own vehicle speed SPDj and a traveling speed SPDs of the preceding vehicle 11 (i.e., a relative traveling speed dSPD between the own vehicle 10 and the preceding vehicle 11) (dSPD=SPDs−SPDj), an inter-vehicle distance D between the own vehicle 10 and the preceding vehicle 11 and a relative orientation of the preceding vehicle 11 with respect to the own vehicle 10 in a chronological manner each time a predetermined time elapses on the basis of a phase difference between the millimeter wave output from the own vehicle sensor 61 and the reflected millimeter wave received by the own vehicle sensor 61, a damping level of the reflected millimeter wave, a detection time of the reflected millimeter wave and the like and store the acquired relative speed dSPD, the inter-vehicle distance D, the relative orientation and the like in the RAM of the sensor ECU 60.

Therefore, the sensor ECU 60 constitutes an own vehicle sensor device that detects or acquires the preceding vehicle 11 on the basis of the reflected millimeter wave detected by the own vehicle sensor 61 and acquire the inter-vehicle distance D between the own vehicle 10 and the preceding vehicle 11 on the basis of the reflected millimeter wave detected by the own vehicle sensor 61.

The GPS device 70 acquires a latitude and a longitude of a point where the own vehicle 10 travels on the basis of a GPS signal sent from an artificial satellite and stores the acquired latitude and longitude as a position of the own vehicle 10 in the RAM of the GPS device 70.

The wireless communication control ECU 80 is electrically connected to the wireless antenna 81 used for performing an inter-vehicle wireless communication. The wireless communication control ECU 80 is configured or programmed to receive communication information or communicating vehicle information and data, which identifies the communicating vehicles, sent from the communicating vehicles through a wireless communication each time a predetermine time elapses and store the received data in the RAM of the wireless communication control ECU 80. Each of the communicating vehicles is different from the own vehicle and has a function that performs the wireless communication. The communicating vehicle information sent from each of the communicating vehicles includes data indicating operation state amounts of each of the communicating vehicles.

The data, which indicates the operation state amounts of each of the communicating vehicles, received by the wireless communication control ECU 80 of the own vehicle 10 through the inter-vehicle wireless communication, includes data acquired by the vehicle control ECU 20, the engine control ECU 30, the brake control ECU 40 and the like of each of the communicating vehicles on the basis of detection signals output from various sensors of each of the communicating vehicles, data of states of the actuators of each of the communicating vehicles, to which the vehicle control ECU 20, the engine control ECU 30, the brake control ECU 40 and the like of each of the communicating vehicles send activation signals and the like.

In particular, the data sent from the communicating vehicle as communicated data includes data (A) to (G) described below.

(A) A traveling speed SPDs of the communicating vehicle acquired by the brake control ECU 40 of the communicating vehicle. Hereinafter, this traveling speed SPDs will be referred to as "the communicating vehicle speed SPDs".

(B) A position of the communicating vehicle acquired by the GPS device 70 of the communicating vehicle.

(C) A requested acceleration Gs of the communicating vehicle calculated by the engine control ECU 30 of the communicating vehicle on the basis of the acceleration pedal operation amount Accp of the communicating vehicle when any of a cooperative following travel control or a CACC (Cooperative Adaptive Cruise Control) and an inter-vehicle distance control or an ACC (Adaptive Cruise Control) is not executed in the communicating vehicle.

(D) The requested acceleration Gs of the communicating vehicle corresponding to a requested deceleration of the communicating vehicle calculated by the brake control ECU 40 of the communicating vehicle on the basis of the brake pedal operation amount Brkp of the communicating vehicle when any of the cooperative following travel control and the inter-vehicle distance control is not executed in the communicating vehicle.

(E) The requested acceleration Gs of the communicating vehicle calculated by the vehicle control ECU 20 of the communicating vehicle on the basis of the requested acceleration Gss of a vehicle traveling immediately in front of the communicating vehicle in order to cause the communicating vehicle to travel following the vehicle traveling immediately in front of the communicating vehicle when any of the cooperative following travel control and the inter-vehicle distance control is executed in the communicating vehicle.

(F) An actual acceleration Gas of the communicating vehicle acquired by the brake control ECU 40 of the communicating vehicle on the basis of the average vehicle wheel speed ωave of the communicating vehicle.

(G) The vehicle travel stabilization control signal S which indicates that at least one of the vehicle travel stabilization controls is executed in the communicating vehicle.

Further, the wireless communication control ECU 80 is configured or programmed to send or output the above-described data indicating the operation state amounts of the own vehicle 10 to the outside of the own vehicle 10 each time a predetermined time elapses.

It should be noted that when any of the cooperative following travel control and the inter-vehicle distance control described later is executed in the own vehicle 10 and the preceding vehicle 11, the requested acceleration Gj of the own vehicle 10 sent from the wireless communication control ECU 80 of the own vehicle 10 to a vehicle traveling immediately behind the own vehicle 10 as the above-described data is a requested acceleration of the own vehicle 10 calculated on the basis of the requested acceleration Gs of the preceding vehicle 11.

Therefore, when any of the cooperative following travel control and the inter-vehicle distance control described later is executed in the preceding vehicle 11 and the vehicle traveling immediately in front of the preceding vehicle 11, the requested acceleration Gs of the preceding vehicle 11 received by the wireless communication control ECU 80 of the own vehicle 10 from the preceding vehicle 11 as the above-described data through the wireless communication is a requested acceleration of the preceding vehicle 11 calculated by the vehicle control ECU 20 of the preceding vehicle 11 on the basis of the requested acceleration Gss of the vehicle traveling immediately in front of the preceding vehicle 11.

<Summary of Cooperative Following Travel Control>

Below, a summary of the cooperative following travel control or the CACC executed by the embodiment control apparatus will be described. The embodiment control apparatus starts to execute the cooperative following travel control when the CACC switch 21 is positioned at an ON-position by the occupant, in particular, the driver of the own vehicle 10. It should be noted that the vehicle control ECU 20 is configured or programmed to control an operation of the engine actuators 32 on the basis of the acceleration pedal operation amount Accp, the engine speed NE and the like when the CACC switch 21 is positioned at an OFF-position. In addition, the brake control ECU 40 is configured or programmed to control an operation of the brake actuator 43 on the basis of the brake pedal operation amount Brkp and the own vehicle speed SPDj or the vehicle wheel rotation speeds ωa to ωd of the vehicle wheels when the CACC switch 21 is positioned at an OFF-position.

When the vehicle control ECU 20 starts to execute the cooperative following travel control, the vehicle control ECU 20 starts to execute a process that identifies a communicating vehicle detected or acquired by the own vehicle sensor 61 among the communicating vehicles, which sends data to the own vehicle 10, as a communicating preceding vehicle on the basis of data acquired by the own vehicle sensor 61 and the sensor ECU 60 and data acquired by the wireless antenna 81 and the wireless communication control ECU 80.

For example, the vehicle control ECU 20 estimates a traveling speed of a candidate vehicle, which is a candidate of the communicating vehicle to be identified as the communicating preceding vehicle 11, on the basis of the relative vehicle speed dSPD and the own vehicle speed SPDj acquired by the sensor ECU 60. When a degree of a similarity between the estimated traveling speed of the candidate vehicle and the traveling speed of the candidate vehicle sent from the candidate vehicle through the wireless communication is high, the vehicle control ECU 20 identifies that candidate vehicle as the communicating preceding vehicle 11. For example, a method described in JP 5522193 B can be used as a method for identifying the communicating preceding vehicle 11.

Further, in this embodiment, a target value Ttgt of a value T obtained by dividing the inter-vehicle distance D by the own vehicle speed SPDj (T=D/SPDj), is previously set. Hereinafter, the value Ttgt will be referred to as "the target inter-vehicle time Ttgt". The target inter-vehicle time Ttgt is set to a predetermined constant value. In this regard, the target inter-vehicle time Ttgt may be variably set by a switch operated by the driver of the own vehicle 10.

<Feedback Control>

The embodiment control apparatus controls the acceleration including the deceleration of the own vehicle 10 such that the value T obtained by dividing the actual inter-vehicle distance D by the actual own vehicle speed SPDj corresponds to the target inter-vehicle time Ttgt when the CACC switch 21 is set at the ON-position by the driver of the own vehicle 10. Hereinafter, the value T will be referred to as "the inter-vehicle time T".

For example, when the communicating preceding vehicle 11 accelerates under the condition that the inter-vehicle time T corresponds to the target inter-vehicle time Ttgt and the own vehicle speed SPDj is constant, the inter-vehicle distance D increases. As a result, the inter-vehicle time T becomes larger than the target inter-vehicle time Ttgt and thus, the embodiment control apparatus accelerates the own vehicle 10 to decrease the inter-vehicle time T.

On the other hand, when the communicating preceding vehicle 11 decelerates under the condition that the inter-vehicle time T corresponds to the target inter-vehicle time Ttgt and the own vehicle speed SPDj is constant, the inter-vehicle distance D decreases. As a result, the inter-vehicle time T becomes smaller than the target inter-vehicle time Ttgt and thus, the embodiment control apparatus decelerates the own vehicle 10 to increase the inter-vehicle time T.

When the embodiment control apparatus accelerates or decelerates the own vehicle 10, the embodiment control apparatus calculates or sets a requested acceleration Gj of the own vehicle 10 as described below and controls the engine control ECU 30 to cause the engine control ECU 30 to control the operation of the engine actuators 32 of the engine or controls the brake control ECU 40 to cause the brake control ECU 40 to control the operation of the brake actuator 43 of the braking device such that the requested acceleration Gj is achieved, that is, such that the acceleration of the own vehicle 10 corresponds to the requested acceleration Gj. The requested acceleration Gj can be any of a positive value for accelerating the own vehicle 10 and a negative value for decelerating the own vehicle 10. Thereby, the requested acceleration Gj can be referred to as a requested acceleration/deceleration Gj.

The embodiment control apparatus multiplies the target inter-vehicle time Ttgt by the actual own vehicle speed SPDj to calculate or acquire a target inter-vehicle distance Dtgt (=Ttgt×SPDj). In this embodiment, the target inter-vehicle time Ttgt is set to a constant value and thus, the calculated target inter-vehicle distance Dtgt increases as the actual own vehicle speed SPDj increases.

Further, the embodiment control apparatus acquires a difference dD of the target inter-vehicle distance Dtgt with respect to the actual inter-vehicle distance D (dD=D−Dtgt). Hereinafter, the difference dD will be referred to as "the inter-vehicle distance difference dD". The acquired inter-vehicle distance difference dD is a positive value when the actual inter-vehicle distance D is larger than the target inter-vehicle distance Dtgt.

In addition, the embodiment control apparatus acquires the relative traveling speed dSPD detected by the own vehicle sensor 61. The acquired relative traveling speed dSPD is a positive value when the traveling speed SPDs of the communicating preceding vehicle 11 is larger than the own vehicle speed SPDj. Hereinafter, the traveling speed SPDs will be referred to as "the preceding vehicle speed SPDs".

Then, the embodiment control apparatus calculates or acquires a total value of a value obtained by multiplying the inter-vehicle distance difference dD by a correction coefficient KFB1 and a value obtained by the relative traveling speed dSPD by a correction coefficient KFB2 as a determination-used calculation value P (=dD×KFB1+dSPD×KFB2). The correction coefficients KFB1 and KFB2 are set to positive constant values larger than "0", respectively.

When the determination-used calculation value P is a positive value, it can be determined that the acceleration of the own vehicle 10 is needed to maintain or control the inter-vehicle time T at or to the target inter-vehicle time Ttgt, that is, to maintain or control the inter-vehicle distance D at or to the target inter-vehicle distance Dtgt.

In this case, the embodiment control apparatus calculates or acquires a feedback requested acceleration GFB by multiplying the determination-used calculation value P by a correction coefficient KFB3 (GFB=(dD×KFB1+dSPD×KFB2)×KFB3). The correction coefficient KFB3 is a positive value larger than "0" and equal to or smaller than "1" and decreases as the own vehicle speed SPDj increases. Therefore, when the acceleration of the own vehicle 10 is needed, the calculated feedback requested acceleration GFB is a positive value.

On the other hand, when the determination-used calculation value P is a negative value, it can be determined that the deceleration of the own vehicle 10 is needed to maintain or control the inter-vehicle time T at or to the target inter-vehicle time Ttgt, that is, to maintain or control the inter-vehicle distance D at or to the target inter-vehicle distance Dtgt. In this case, the embodiment control apparatus acquires the determination-used calculation value P as the feedback requested acceleration GFB (=dD×KFB1+dSPD×KFB2). Therefore, when the deceleration of the own vehicle 10 is needed, the acquired feedback requested acceleration GFB is a negative value.

The embodiment control apparatus can control the inter-vehicle time T to the target inter-vehicle time Ttgt by accelerating or decelerating the own vehicle 10 such that the feedback requested acceleration GFB is achieved. In this regard, the inter-vehicle distance D and the relative traveling speed dSPD acquired by the sensor ECU 60 varies, for example, after the communicating preceding vehicle 11 starts to accelerate or decelerate. Therefore, if the acceleration or deceleration of the own vehicle 10 is controlled only using the feedback requested acceleration GFB, the start timing of the acceleration or deceleration of the own vehicle 10 delays with respect to the start timing of the acceleration or deceleration of the communicating preceding vehicle 11.

<Feedforward Control>

Accordingly, the embodiment control apparatus predicts the start of the acceleration or deceleration of the communicating preceding vehicle 11 on the basis of preceding vehicle acceleration information on the acceleration of the communicating preceding vehicle 11 acquired by the wireless communication control ECU 80 and controls the acceleration of the own vehicle 10 on the basis of the result of the prediction.

In particular, the embodiment control apparatus calculates or estimates or acquires the acceleration Ges of the communicating preceding vehicle 11 on the basis of a value fh(Gs) obtained by filtering the requested acceleration Gs of the communicating preceding vehicle 11 with a high-pass filter and a value hl(Gas) obtained by filtering the actual acceleration Gas of the communicating preceding vehicle 11 with a low-pass filter when the requested acceleration Gs and the actual acceleration Gas of the communicating preceding vehicle 11 have been acquired by the wireless communication control ECU 80. Hereinafter, the estimated acceleration Ges of the communicating preceding vehicle 11 will be simply referred to as "the estimated acceleration Ges".

Alternatively, the embodiment control apparatus acquires or estimates an actual acceleration Gas of the communicating preceding vehicle 11 as the estimated acceleration Ges of the communicating preceding vehicle 11 when only the actual acceleration Gas of the communicating preceding vehicle 11 is acquired by the wireless communication control ECU 80.

When the acceleration of the communicating preceding vehicle 11 is predicted, the calculated or acquired estimated acceleration Ges is a positive value. On the other hand, when the deceleration of the communicating preceding vehicle 11 is predicted, the calculated or acquired estimated acceleration Ges is a negative value.

The embodiment control apparatus calculates or acquires a value obtained by multiplying the calculated or acquired estimated acceleration Ges by a coefficient smaller than "1" as a feedforward requested acceleration GFF. When the acceleration of the communicating preceding vehicle 11 is predicted, the calculated feedforward requested acceleration GFF is a positive value. On the other hand, when the deceleration of the communicating preceding vehicle 11 is predicted, the calculated feedforward requested acceleration GFF is a negative value.

The embodiment control apparatus calculates or acquires a conclusive requested acceleration Gj of the own vehicle 10 by adding the feedforward requested acceleration GFF to the feedback requested acceleration GFB (Gj=GFF+GFB) and controls operations of the engine actuators 32 of the engine or an operation of the brake actuator 43 of the braking device such that the calculated requested acceleration Gj is achieved. When the own vehicle 10 should be accelerated, the calculated requested acceleration Gj is a positive value. On the other hand, when the own vehicle 10 should be decelerated, the calculated requested acceleration Gj is a negative value.

It should be noted that the conclusive requested acceleration Gj of the own vehicle 10 which is an acceleration obtained by adding the feedforward requested acceleration GFF to the feedback requested acceleration GFB will be referred to as "the CACC requested G" in some cases. The CACC corresponding to the cooperative following travel control is a control that makes the acceleration of the own vehicle 10 correspond to the CACC requested G. The ACC corresponding to the inter-vehicle distance control is a control that makes the acceleration of the own vehicle 10 correspond to the conclusive requested acceleration Gj corresponding to the feedback requested acceleration GFB without using the feedforward requested acceleration GFF.

The cooperative following travel control can accelerate or decelerate the own vehicle 10 while predicting the acceleration or deceleration of the communicating preceding vehicle 11. Therefore, the inter-vehicle time T can be controlled to the target inter-vehicle time Ttgt with a high following property. In other words, the own vehicle 10 can be caused to travel accurately following the communicating preceding vehicle 11.

When the anti-lock brake control is executed in the communicating preceding vehicle 11, any of the vehicle wheel speeds ωa to ωd of the vehicle wheels of the communicating preceding vehicle 11 may increase while the locked state of the vehicle wheel of the communicating preceding vehicle 11 is eliminated. In this case, the actual acceleration Gas of the communicating preceding vehicle 11 calculated on the basis of the average vehicle wheel speed ωave of the communicating preceding vehicle 11 increases and the communicating preceding vehicle 11 sends the increased actual acceleration Gas to the own vehicle 10. In this regard, even when any of the vehicle wheel speeds ωa to ωd of the communicating preceding vehicle 11 is increased due to the execution of the anti-lock brake control in the communicating preceding vehicle 11, the communicating preceding vehicle 11 is not accelerated.

Therefore, if the requested acceleration Gj of the own vehicle 10 is set using the feedforward requested acceleration GFF set on the basis of the actual acceleration Gas sent from the communicating preceding vehicle 11, the own vehicle 10 may be accelerated and the inter-vehicle distance D may decrease.

In addition, when the acceleration pedal operation amount Accp of the communicating preceding vehicle 11 is increased, the traction control or the vehicle behavior stabilization control may be executed in the communicating preceding vehicle 11. In this case, the communicating preceding vehicle 11 sends to the own vehicle 10, the requested acceleration Gs calculated on the basis of the increased acceleration pedal operation amount Accp. In this regard, when the traction control or the vehicle behavior stabilization control is executed in the communicating preceding vehicle 11, the friction braking force is applied to at least one of the vehicle wheels of the communicating preceding vehicle 11 and therefore, even when the acceleration pedal operation amount Accp of the communicating preceding vehicle 11 is increased, the actual acceleration of the communicating preceding vehicle 11 does not correspond to a value depending on the increased acceleration pedal operation amount Accp of the communicating preceding vehicle 11.

Therefore, if the requested acceleration Gj of the own vehicle 10 is set using the feedforward requested acceleration GFF set on the basis of the requested acceleration Gs sent from the communicating preceding vehicle 11, the own vehicle 10 may be accelerated at an acceleration depending on the requested acceleration Gs of the communicating preceding vehicle 11 and the inter-vehicle distance D may decrease even when the communicating preceding vehicle 11 is not accelerated at an acceleration generally equal to the requested acceleration Gs of the communicating preceding vehicle 11.

Accordingly, the embodiment control apparatus sets the feedforward requested acceleration GFF to zero when at least one of the vehicle travel stabilization controls (i.e., the anti-lock control, the traction control and the vehicle behavior stabilization control) is executed in the communicating preceding vehicle 11 and the feedforward requested acceleration GFF acquired or set as described above is larger than zero. In other words, the embodiment control apparatus sets an upper limit of the feedforward requested acceleration GFF to zero when at least one of the vehicle travel stabilization controls is executed in the communicating preceding vehicle 11. That is, the embodiment control apparatus limits the feedforward requested acceleration GFF to a value equal to or smaller than zero.

Thereby, when at least one of the vehicle travel stabilization controls is executed in the communicating preceding vehicle 11 and thus, the communicating preceding vehicle 11 is unlikely to be accelerated at the acceleration depending on the requested acceleration Gs or the actual acceleration Gas of the communicating preceding vehicle 11, the own vehicle 10 is not accelerated forward due to the feedforward requested acceleration GFF. As a result, the inter-vehicle distance D does not decrease excessively and thus, the own vehicle 10 can be caused to travel following the communicating preceding vehicle 11 accurately.

It should be noted that when the vehicle travel stabilization control is executed in the communicating preceding vehicle 11 and the calculated or acquired feedforward requested acceleration GFF is smaller than zero, the requested acceleration Gj of the own vehicle 10 is set using the calculated feedforward requested acceleration GFF. In this case, the own vehicle 10 is decelerated such that the inter-vehicle distance D increases and thus, the occupants including the driver of the own vehicle 10 does not feel anxious.

<Actual Operation>

Next, the cooperative following travel control (the CACC) executed by the embodiment control apparatus will be concretely described. The CPU of the vehicle control ECU 20 is programmed or configured to start an execution of a routine shown by a flowchart in FIG. 2 each time a predetermined time elapses. Therefore, at a predetermined timing, the CPU starts to execute this routine from a step 200 and then, proceeds with the process to a step 205 to determine whether or not the CACC switch 21 is positioned at the ON-position.

Figure 2:
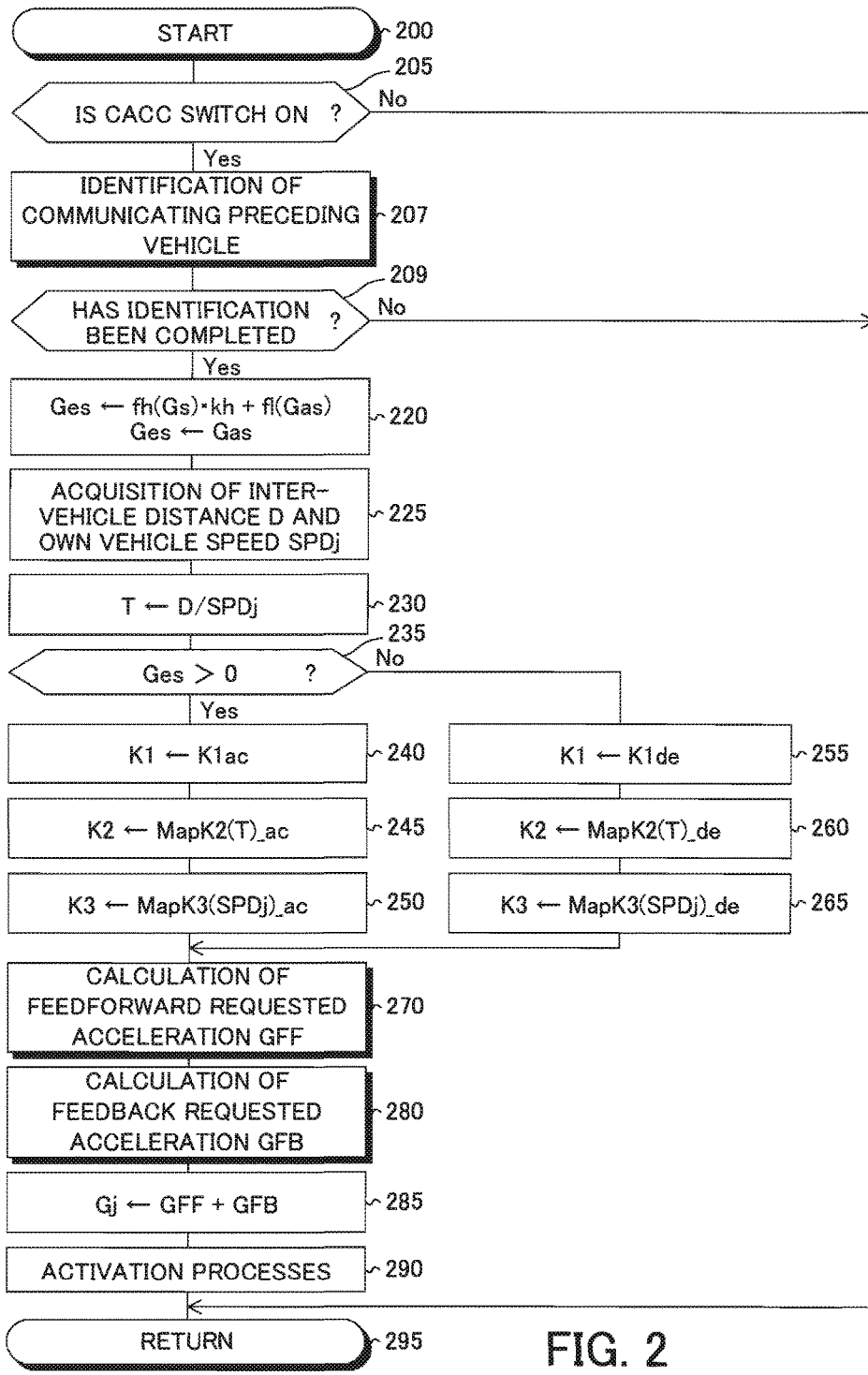
FIG. 2 shows a flowchart of a routine executed by a CPU of a vehicle control ECU shown in FIG. 1.
Figure 3:
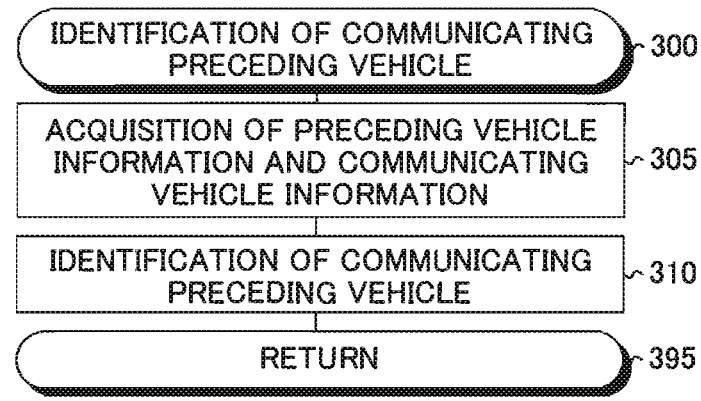
FIG. 3 shows a flowchart of a routine executed by the CPU.

When the CACC switch 21 is positioned at the ON-position, the CPU determines "Yes" at the step 205 and then, proceeds with the process to a step 207 to start an execution of a routine shown by a flowchart in FIG. 3 to identify the communicating preceding vehicle 11. That is, when the CPU proceeds with the process to the step 207, the CPU starts to execute the routine from a step 300 of FIG. 3 and then, executes processes of steps 305 and 310 described below. Then, the CPU proceeds with the process to a step 209 of FIG. 2 via a step 395.

Step 305: The CPU acquires preceding vehicle information including data of the operation state amounts of the preceding vehicle from the sensor ECU 60 and acquires communicating vehicle information including data of the operation state amounts of the communicating vehicles from the wireless communication control ECU 80.

Step 310: The CPU identifies the communicating preceding vehicle 11 among the communicating vehicles on the basis of the operation state amounts of the communicating vehicles included in the communicating vehicle information and the operation state amounts of the preceding vehicle 11 included in the preceding vehicle information. For example, the CPU calculates or estimates the traveling speed of the preceding vehicle 11 on the basis of the relative traveling speed dSPD acquired by the own vehicle sensor 61 and the own vehicle speed SPDj. Then, when the degree of the similarity between the calculated traveling speed of the preceding vehicle 11 and the traveling speed of the communicating vehicle sent from the communicating vehicle through a wireless communication is large, the CPU identifies that communicating vehicle as the communicating preceding vehicle 11.

It should be noted that after a particular communicating vehicle is identified as the communicating preceding vehicle 11 by the execution of the process of the step 310 once, the identified communicating vehicle is employed as the communicating preceding vehicle 11 until the CPU determines that the identified communicating vehicle is not the preceding vehicle 11.

When the CPU proceeds with the process to the step 209, the CPU determines whether or not the identification of the communicating preceding vehicle 11 has been completed at the step 207. When the identification of the communicating preceding vehicle 11 has been completed, the CPU determines "Yes" at the step 209 and then, sequentially executes processes of steps 220 to 230 described below.

Step 220: The CPU calculates or acquires, as the estimated acceleration Ges (=fh(Gs)+fl(Gas)), a total value of a value obtained by multiplying a value fh(Gs) obtained by filtering the requested acceleration Gs of the communicating preceding vehicle 11 with the high-pass filter by a predetermined positive coefficient kh (in this embodiment, "1") and a value fl(Gas) obtained by filtering the actual acceleration Gas of the communicating preceding vehicle 11 with the low-pass filter when the requested acceleration Gs and the actual acceleration Gas are included in the communicating vehicle information acquired at the step 207 (in particular, the step 305 of FIG. 3) and relating to the communicating vehicle identified as the communicating preceding vehicle 11 at the step 207 (in particular, at the step 310 of FIG. 3). Hereinafter, the communicating vehicle information will be referred to as "the communicating preceding vehicle information".

Alternatively, the CPU employs the actual acceleration Gas as the estimated acceleration Ges when no requested acceleration Gs is included in the communicating preceding vehicle information and only the actual acceleration Gas is included in the communicating preceding vehicle information.

Step 225: The CPU acquires the inter-vehicle distance D from the sensor ECU 60 and acquires the own vehicle speed SPDj from the brake control ECU 40. The sensor ECU 60 executes a separate routine to acquire the inter-vehicle distance D on the basis of the detection signal of the own vehicle sensor 61 and store the acquired inter-vehicle distance D in the RAM of the sensor ECU 60. The brake control ECU 40 executes a separate routine to acquire the own vehicle speed SPDj on the basis of the detection signal of the vehicle wheel speed sensors 42 and store the acquired own vehicle speed SPDj in the RAM of the brake control ECU 40.

Step 230: The CPU calculates or acquires a value obtained by dividing the inter-vehicle distance D by the own vehicle speed SPDj as the inter-vehicle time T (=D/SPDj). The inter-vehicle time T is a time taken for the own vehicle 10 to travel for the inter-vehicle distance D at the own vehicle speed SPDj.

Next, the CPU proceeds with the process to a step 235 to determine whether or not the estimated acceleration Ges calculated or acquired at the step 220 is larger than zero. When the estimated acceleration Ges is larger than zero, the CPU determines "Yes" at the step 235 and then, sequentially executes processes of steps 240 to 250 described below. Then, the CPU proceeds with the process to a step 270.

Step 240: The CPU sets a first correction coefficient Klac for the acceleration as the first correction coefficient K1. The first correction coefficient Klac for the acceleration is a constant value smaller than "1". In this regard, the first correction coefficient Klac for the acceleration may be "1".

Figure 6A:
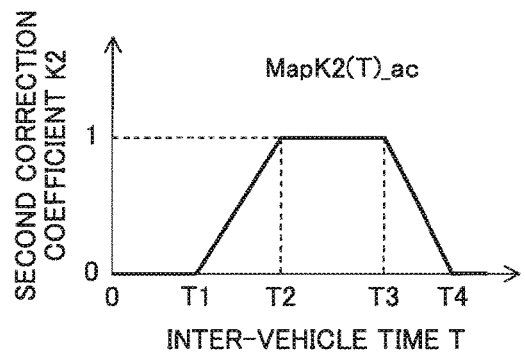
FIG. 6(A) shows a look-up table used for acquiring a second correction coefficient for an acceleration on the basis of an inter-vehicle time.

Step 245: The CPU applies the inter-vehicle time T to a look-up table MapK2(T)_ac shown in FIG. 6(A) to acquire the second correction coefficient K2 for the acceleration. According to the look-up table MapK2(T)_ac, when the inter-vehicle time T is between "0" and a time T1, the second correction coefficient K2 for the acceleration is "0". When the inter-vehicle time T is between the time T1 and a time T2, the second correction coefficient K2 for the acceleration is a value equal to or smaller than "1" and increases as the inter-vehicle time T increases. When the inter-vehicle time T is between the time T2 and a time T3, the second correction coefficient K2 for the acceleration is "1". When the inter-vehicle time T is between the time T3 and a time T4, the second correction coefficient K2 for the acceleration is a value equal to or smaller than "1" and decreases as the inter-vehicle time T increases. When the inter-vehicle time T is larger than the time T4, the second correction coefficient K2 for the acceleration is "0".

Figure 6B:
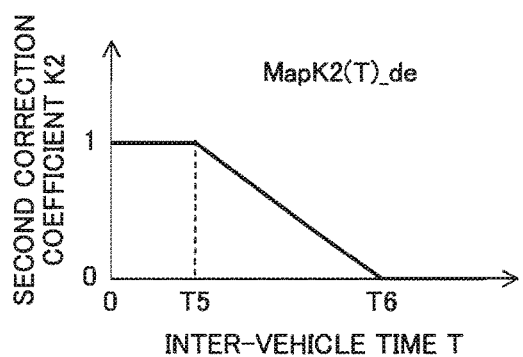
FIG. 6(B) shows a look-up table used for acquiring a second correction coefficient for a deceleration on the basis of the inter-vehicle time.
Figure 6C:
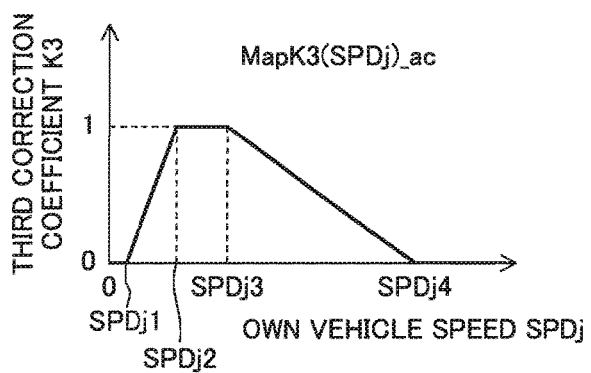
FIG. 6(C) shows a look-up table used for acquiring a third correction coefficient for an acceleration on the basis of a traveling speed of an own vehicle.

Step 250: The CPU applies the own vehicle speed SPDj to a look-up table MapK3(SPDj)_ac shown in FIG. 6(C) to acquire the third correction coefficient K3 for the acceleration. According to the look-up table MapK3(SPDj)_ac, when the own vehicle speed SPDj is between "0" and a vehicle speed SPDj1, the third correction coefficient K3 for the acceleration is "0". When the own vehicle speed SPDj is between the vehicle speed SPDj1 and a vehicle speed SPDj2, the third correction coefficient K3 for the acceleration is equal to or smaller than "1" and increases as the own vehicle speed SPDj increases. When the own vehicle speed SPDj is between the vehicle speed SPDj2 and a vehicle speed SPDj3, the third correction coefficient K3 for the acceleration is "1". When the own vehicle speed SPDj is between the vehicle speed SPDj3 and a vehicle speed SPDj4, the third correction coefficient K3 for the acceleration is equal to or smaller than "1" and decreases as the own vehicle speed SPDj increases. When the own vehicle speed SPDj is larger than the vehicle speed SPDj4, the third correction coefficient K3 for the acceleration is "0".

When the estimated acceleration Ges is equal to or smaller than "0" upon the execution of the process of the step 235, the CPU determines "No" at the step 235 and then, sequentially executes processes of steps 255 to 265 described below. Then, the CPU proceeds with the process to a step 270.

Step 255: The CPU sets a first correction coefficient Klde for the deceleration as the first correction coefficient K1. The first correction coefficient Klde for the deceleration is a constant value smaller than "1" and equal to or larger than the first correction coefficient Klac for the acceleration. In this regard, the first correction coefficient Klde for the deceleration may be "1".

Step 260: The CPU applies the inter-vehicle time T to a look-up table MapK2(T)_de shown in FIG. 6(B) to acquire the second correction coefficient K2 for the deceleration. According to the look-up table MapK2(T)_de, when the inter-vehicle time T is between "0" and a time T5, the second correction coefficient K2 for the deceleration is "1". When the inter-vehicle time T is between the time T5 and a time T6, the second correction coefficient K2 for the deceleration is equal to or smaller than "1" and decreases as the inter-vehicle time T increases. When the inter-vehicle time T is larger than the time T6, the second correction coefficient K2 for the deceleration is "0".

Figure 6D:
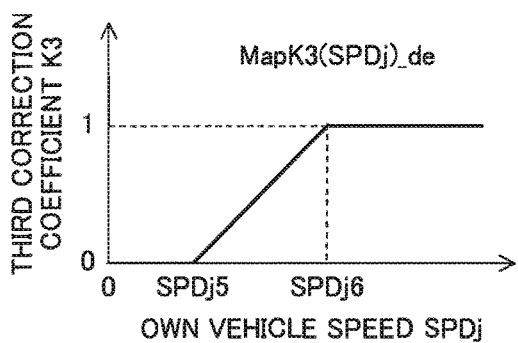
FIG. 6(D) shows a look-up table used for acquiring a third correction coefficient for a deceleration on the basis of the traveling speed of the own vehicle.

Step 265: The CPU applies the own vehicle speed SPDj to a look-up table MapK3(SPDj)_de shown in FIG. 6(D) to acquire the third correction coefficient K3 for the deceleration. According to the look-up table MapK3(SPDj)_de, when the own vehicle speed SPDj is between "0" and a vehicle speed SPDj5, the third correction coefficient K3 for the deceleration is "0". When the own vehicle speed SPDj is between the vehicle speed SPDj5 and a vehicle speed SPDj6, the third correction coefficient K3 for the deceleration is equal to or smaller than "1" and increases as the own vehicle speed SPDj increases. When the own vehicle speed SPDj is larger than the vehicle speed SPDj6, the third correction coefficient K3 for the deceleration is equal to "1".

Figure 4:
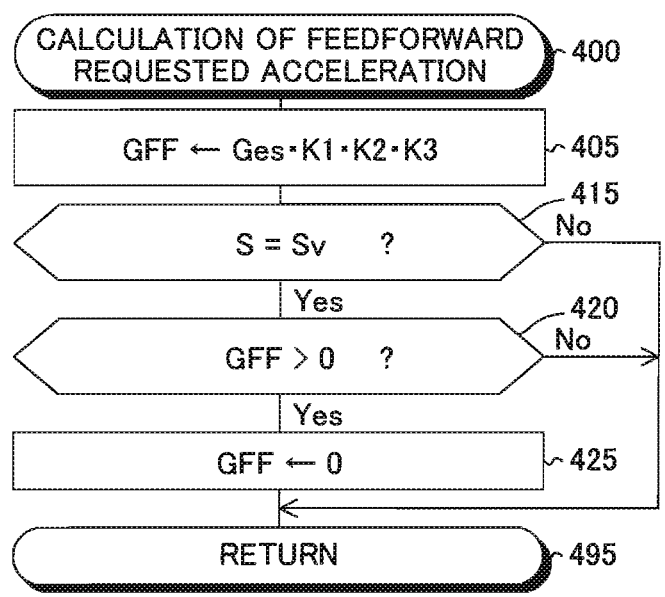
FIG. 4 shows a flowchart of a routine executed by the CPU.

When the CPU proceeds with the process to the step 270, the CPU starts to execute a feedforward requested acceleration calculation routine shown by a flowchart in FIG. 4 to calculate the feedforward requested acceleration GFF. Therefore, when the CPU proceeds with the process to the step 270, the CPU starts to execute the routine from a step 400 of FIG. 4 and then, executes a process of step 405 described below.

Step 405: The CPU calculates or acquires the feedforward requested acceleration GFF in accordance with a following expression (1).

$$GFF = Ges \times K1 \times K2 \times K3 \tag{1}$$

In the expression (1), the symbol "Ges" is the estimated acceleration calculated or acquired at the step 220 of FIG. 2, the symbol "K1" is the first correction value set at the step 240 or 255, the symbol "K2" is the second correction value set at the step 245 or 260 and the symbol "K3" is the third correction value set at the step 250 or 265.

Then, the CPU proceeds with the process to a step 415 to determine whether or not the vehicle travel stabilization control signal S included in the communicating vehicle information acquired at the step 207 of FIG. 2 (in particular, at the step 305 of FIG. 3) corresponds to a signal Sv which indicates that at least one of the vehicle travel stabilization controls is executed in the communicating preceding vehicle 11.

When the vehicle travel stabilization control signal S corresponds to the signal Sv, the CPU determines "Yes" at the step 415 and then, proceeds with the process to a step 420 to determine whether or not the feedforward requested acceleration GFF is larger than zero.

When the feedforward requested acceleration GFF is larger than zero, the CPU determines "Yes" at the step 420 and then, proceeds with the process to a step 425 to set the feedforward requested acceleration GFF to zero. Then, the CPU proceeds with the process to a step 280 of FIG. 2 via a step 495. On the other hand, when the feedforward requested acceleration GFF is equal to or smaller than zero, the CPU determines "No" at the step 420 and then, proceeds with the process directly to the step 280 of FIG. 2 via the step 495. As a result, the feedforward requested acceleration GFF is limited to a value equal to or smaller than zero.

On the other hand, when the vehicle travel stabilization control signal S does not correspond to the signal Sv upon the execution of the process of the step 415, that is, when the vehicle travel stabilization control signal S corresponds to the signal Sn, the CPU determines "No" at the step 415 and then, proceeds with the process to the step 280 of FIG. 2 via the step 495.

Figure 5:
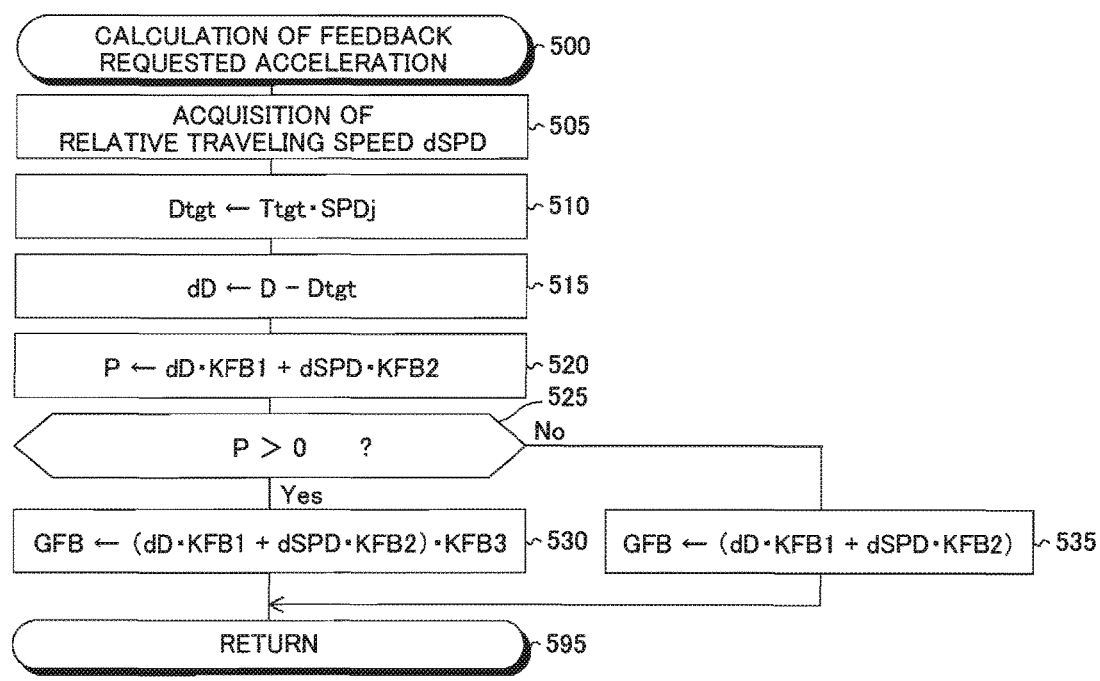
FIG. 5 shows a flowchart of a routine executed by the CPU.

When the CPU proceeds with the process to the step 280, the CPU starts to execute a feedback requested acceleration calculation routine shown by a flowchart in FIG. 5 to calculate the feedback requested acceleration GFB. Therefore, when the CPU proceeds with the process to the step 280, the CPU starts the execution of the routine from a step 500 of FIG. 5 and then, sequentially executes processes of steps 505 and 520 described below.

Step 505: The CPU acquires the relative traveling speed dSPD from the sensor ECU 60. The sensor ECU 60 executes a separate routine to acquire the relative traveling speed dSPD on the basis of the detection signal of the own vehicle sensor 61 and store the acquired relative traveling speed dSPD in the RAM of the sensor ECU 60.

Step 510: The CPU calculates or acquires the target inter-vehicle distance Dtgt by multiplying the target inter-vehicle time Ttgt by the own vehicle speed SPDj acquired at the step 225 of FIG. 2 (Dtgt=Ttgt×SPDj). As described above, the target inter-vehicle time Ttgt is set to a constant value.

Step 515: The CPU calculates or acquires the inter-vehicle distance difference dD by subtracting the target inter-vehicle distance Dtgt from the inter-vehicle distance D acquired at the step 225 of FIG. 2 (dD=D−Dtgt).

Step 520: The CPU calculates or acquires the determination-used calculation value P in accordance with a following expression (2).

$$P = dD \times KFB1 + dSPD \times KFB2 \quad (2)$$

In the expression (2), the symbol "dD" is the inter-vehicle distance difference calculated at the step 515, the symbol "dSPD" is the relative traveling speed acquired at the step 505 and the symbols "KFB1" and "KFB2" are correction coefficients, respectively, which are positive constant values larger than "0".

Then, the CPU proceeds with the process to a step 525 to determine whether or not the determination-used calculation value P is larger than zero. The determination-used calculation value P larger than zero indicates that the acceleration request due to the inter-vehicle distance D occurs in the own vehicle 10 and the determination-used calculation value P equal to or smaller than zero indicates that no acceleration request due to the inter-vehicle distance D occurs in the own vehicle 10.

When the determination-used calculation value P is larger than zero, the CPU determines "Yes" at the step 525 and then, proceeds with the process to a step 530 to calculate or acquire the feedback requested acceleration GFB in accordance with a following expression (3). Then, the CPU proceeds with the process to a step 285 of FIG. 2 via a step 595.

$$GFB = (dD \times KFB1 + dSPD \times KFB2) \times KFB3 \quad (3)$$

In the expression (3), the symbol "KFB3" is a correction coefficient which is a positive value larger than "0" and smaller than "1" and decreases as the own vehicle speed SPDj increases.

On the other hand, when the determination-used calculation value P is equal to or smaller than zero upon the execution of the process of the step 525, the CPU determines "No" at the step 525 and then, proceeds with the process to a step 535 to calculate or acquire the feedback requested acceleration GFB in accordance with a following expression (4). Then, the CPU proceeds with the process to a step 285 of FIG. 2 via the step 595.

$$GFB = dD \times KFB1 + dSPD \times KFB2 \quad (4)$$

When the CPU proceeds with the process to the step 285 of FIG. 2, the CPU calculates or acquires the requested acceleration Gj of the own vehicle 10 by adding the feedback requested acceleration GFB calculated at the step 280 to the feedforward requested acceleration GFF calculated or acquired at the step 270 (Gj=GFF+GFB).

Then, the CPU proceeds with the process to a step 290 to execute processes for activating the engine actuators 32 of the engine or the brake actuator 43 of the braking device such that the requested acceleration Gj calculated at the step 285 is achieved, that is, such that the acceleration (in particular, acceleration/deceleration) of the own vehicle 10 corresponds to the requested acceleration Gj. Thereby, when the requested acceleration Gj is larger than zero, the own vehicle 10 is accelerated. On the other hand, when the requested acceleration Gj is smaller than zero, the own vehicle 10 is decelerated. Then, the CPU proceeds with the process to a step 295 to terminate the execution of this routine once.

It should be noted that when the CACC switch 21 is positioned at the OFF-position upon the execution of the process of the step 205, the CPU determines "No" at the step 205 and then, proceeds with the process directly to the step 295 to terminate the execution of this routine once.

Further, when the identification of the communicating preceding vehicle 11 has not been completed upon the execution of the process of the step 209, the CPU determines "No" at the step 209 and then, proceeds with the process directly to the step 295 to terminate the execution of this routine once.

It should be noted that when the identification of the communicating preceding vehicle 11 has not been completed, however, a vehicle is acquired by the own vehicle sensor 61 and the sensor ECU 60 as the preceding vehicle 11, in other words, the relative traveling speed dSPD, the inter-vehicle distance D, the relative orientation and the like have been acquired upon the execution of the process of the step 209, the CPU may proceed with the process to the step 280 after the CPU sets the feedforward requested acceleration GFF to zero. In this case, the feedback control (i.e., the inter-vehicle distance control) on the basis of the feedback requested acceleration GFB is executed.

The concrete cooperative following travel control executed by the embodiment control apparatus has been described. According to this control, when the vehicle travel stabilization control is executed, the feedforward requested acceleration GFF is set to zero and thus, as described above, the own vehicle 10 can be caused to travel accurately following the communicating preceding vehicle 11.

It should be noted that when the feedforward requested acceleration GFF is a negative value, for example, when the brake pedal operation amount Brkp of the communicating preceding vehicle 11 increases or when any of the vehicle wheel speeds ωa to ωd of the communicating preceding vehicle 11 decreases even under the condition that the vehicle travel stabilization control is executed, the feedforward requested acceleration GFF is considered in the calculation of the requested acceleration Gj of the own vehicle 10 without setting the feedforward requested acceleration GFF to zero. Therefore, when the communicating preceding vehicle 11 starts to decelerate, the own vehicle 10 can be caused to be decelerated with predicting the deceleration of the communicating preceding vehicle 11 and thus, the own vehicle 10 can be caused to travel accurately following the communicating preceding vehicle 11 without decreasing the inter-vehicle distance D.

The present disclosure is not limited to the embodiment and various modifications can be employed within a scope of the present disclosure.

For example, when the estimated acceleration Ges is larger than zero, the control apparatus according to the embodiment may be configured simply to calculate, as the feedforward requested acceleration GFF, a value obtained by multiplying the estimated acceleration Ges by a predetermined positive correction coefficient Klac (GFF=Ges× Klac).

Further, when the estimated acceleration Ges is equal to or smaller than zero, the control apparatus according to the embodiment may be configured simply to calculate, as the feedforward requested acceleration GFF, a value obtained by multiplying the estimated acceleration Ges by a predetermined positive correction coefficient Klde (GFF=Ges× Klde).

Further, at the step 285, the total value of the feedback requested acceleration GFB and the feedforward requested acceleration GFF is calculated as the requested acceleration Gj of the own vehicle 10. However, for example, a weighted average of the feedback requested acceleration GFB and the feedforward requested acceleration GFF may be calculated as the requested acceleration Gj of the own vehicle 10. In other words, the requested acceleration Gj of the own vehicle 10 may be calculated in accordance with a following expression (5). In the expression (5), the symbols "α" and "β" are positive constants, respectively. The constants α and β are larger than "0" and smaller than "1" and the constant α may be a value 1−β.

$$Gj = \alpha \times GFF + \beta \times GFB \quad (5)$$

Further, the control apparatus according to the embodiment may be configured simply to calculate, as the feedback requested acceleration GFB, a value obtained by multiplying the inter-vehicle distance difference dD by a predetermined correction coefficient KFB (GFB=KFB×dD). The correction coefficient KFB is a constant positive value larger than "0".

In addition, the control apparatus according to the embodiment calculates the feedforward requested acceleration GFF on the basis of the requested acceleration Gs and the actual acceleration Gas of the communicating preceding vehicle 11 acquired through the wireless communication. In this regard, the control apparatus may calculate the feedforward requested acceleration GFF only on the basis of the requested acceleration Gs without using the actual acceleration Gas or only on the basis of the actual acceleration Gas without using the requested acceleration Gs.

Further, when the acceleration pedal operation amount Accp and the brake pedal operation amount Brkp in place of the requested acceleration Gs are sent from the communicating preceding vehicle 11, the control apparatus according to the embodiment may be configured to acquire the acceleration pedal operation amount Accp and the brake pedal operation amount Brkp as information on the requested acceleration Gs of the communicating preceding vehicle 11, estimate the requested acceleration Gs of the communicating preceding vehicle 11 on the basis of the acceleration pedal operation amount Accp and the brake pedal operation amount Brkp and calculate the feedforward requested acceleration GFF using the estimated requested acceleration Gs.

Similarly, when the vehicle wheel rotation speeds ωa to ωd or the average vehicle wheel rotation speed ωave in place of the actual acceleration Gas is/are sent from the communicating preceding vehicle 11, the control apparatus according to the embodiment may be configured to acquire the vehicle wheel rotation speeds ωa to ωd or the average vehicle wheel rotation speed ωave as information on the actual acceleration Gas of the communicating preceding vehicle 11, estimate the actual acceleration Gas of the communicating preceding vehicle 11 on the basis of the vehicle wheel rotation speeds ωa to ωd or the average vehicle wheel rotation speed ωave and calculate the feedforward requested acceleration GFF using the estimated actual acceleration Gas.

What is claimed is:

1. A control apparatus of a vehicle, comprising:
    an inter-vehicle distance detection device that detects an inter-vehicle distance between an own vehicle and a communicating preceding vehicle;
    a wireless communication device that acquires communicating preceding vehicle information including at least one of requested acceleration information on a requested acceleration of the communicating preceding vehicle and actual acceleration information on an actual acceleration of the communicating preceding vehicle from the communicating preceding vehicle through a wireless communication; and
    an acceleration control device that controls an acceleration of the own vehicle such that the acceleration of the own vehicle corresponds to a requested acceleration of the own vehicle, the acceleration control device including:
        first calculation means for calculating a feedback requested acceleration which is an acceleration requested by the own vehicle to maintain the inter-vehicle distance at a target inter-vehicle distance;
        second calculation means for calculating a feedforward requested acceleration which is an acceleration requested by the own vehicle to cause the own vehicle to travel following the communicating preceding vehicle on the basis of at least one of the requested acceleration information and the actual acceleration information; and
        third calculation means for calculating a requested acceleration of the own vehicle on the basis of the feedback requested acceleration and the feedforward requested acceleration,
    the acceleration control device being configured to execute a following travel control that causes the own vehicle to travel following the communicating preceding vehicle by controlling the acceleration of the own vehicle such that the acceleration of the own vehicle corresponds to the requested acceleration of the own vehicle calculated by the third calculation means,
    wherein the third calculation means is configured to set the feedforward requested acceleration to zero when the communicating preceding vehicle information includes information indicating that a vehicle travel stabilization control is executed to control a friction braking force applied to at least one of vehicle wheels of the communicating preceding vehicle from a friction braking device of the communicating preceding vehicle to stabilize a traveling of the communicating preceding vehicle, and indicating that the feedforward requested acceleration is larger than zero.

2. The control apparatus according to claim 1, wherein when a control apparatus of the communicating preceding vehicle does not execute a control to cause the communicating preceding vehicle to travel following a vehicle traveling in front of the communicating preceding vehicle, the requested acceleration of the communicating preceding vehicle is a requested acceleration calculated by the control apparatus of the communicating preceding vehicle on the basis of an operation amount of an acceleration operation element of the communicating preceding vehicle and an operation amount of a brake operation element of the communicating preceding vehicle.

3. The control apparatus according to claim 2, wherein when the control apparatus of the communicating preceding vehicle executes the control to cause the communicating preceding vehicle to travel following the vehicle traveling in front of the communicating preceding vehicle, the requested acceleration of the communicating preceding vehicle is a requested acceleration of the communicating preceding vehicle calculated by the control apparatus of the communicating preceding vehicle on the basis of acceleration information on an acceleration of the vehicle traveling in front of the communicating preceding vehicle acquired from the vehicle traveling in front of the communicating preceding vehicle through the wireless communication by the control apparatus of the communicating preceding vehicle.

4. The control apparatus according to claim 1, wherein the vehicle travel stabilization control includes at least one of:
    a control to adjust a friction braking force applied to at least one of the vehicle wheels of the communicating preceding vehicle determined as a vehicle wheel locked during a braking of the communication preceding vehicle to eliminate a locked state of the vehicle wheel;

a control to apply the friction braking force to at least one of driving wheels of the communicating preceding vehicle determined as a driving wheel slipped during an acceleration of the communicating preceding vehicle to eliminate a slipped state of the driving wheel; and a control to apply the friction braking force to at least one of the vehicle wheels of the communicating preceding vehicle to eliminate a sidesliped state of the communicating preceding vehicle determined to be generated during a turning travel of the communicating preceding vehicle.

5. A control apparatus of a vehicle, comprising:

an inter-vehicle distance detection device that detects an inter-vehicle distance between an own vehicle and a communicating preceding vehicle;

a wireless communication device that acquires communicating preceding vehicle information including at least one of requested acceleration information on a requested acceleration of the communicating preceding vehicle and actual acceleration information on an actual acceleration of the communicating preceding vehicle from the communicating preceding vehicle through a wireless communication; and an acceleration control device that controls an acceleration of the own vehicle such that the acceleration of the own vehicle corresponds to a requested acceleration of the own vehicle, the acceleration control device including circuitry configured to:

calculate a feedback requested acceleration which is an acceleration requested by the own vehicle to maintain the inter-vehicle distance at a target inter-vehicle distance;

calculate a feedforward requested acceleration which is an acceleration requested by the own vehicle to cause the own vehicle to travel following the communicating preceding vehicle on the basis of at least one of the requested acceleration information and the actual acceleration information; and calculate a requested acceleration of the own vehicle on the basis of the feedback requested acceleration and the feedforward requested acceleration, the acceleration control device being configured to execute a following travel control that causes the own vehicle to travel following the communicating preceding vehicle by controlling the acceleration of the own vehicle such that the acceleration of the own vehicle corresponds to the requested acceleration of the own vehicle calculated by the circuitry, wherein the circuitry is configured to set the feedforward requested acceleration to zero when the communicating preceding vehicle information includes information indicating that a vehicle travel stabilization control is executed to control a friction braking force applied to at least one of vehicle wheels of the communicating preceding vehicle from a friction braking device of the communicating preceding vehicle to stabilize a traveling of the communicating preceding vehicle, and indicating that the feedforward requested acceleration is larger than zero.

6. The control apparatus according to claim 5, wherein when a control apparatus of the communicating preceding vehicle does not execute a control to cause the communicating preceding vehicle to travel following a vehicle traveling in front of the communicating preceding vehicle, the requested acceleration of the communicating preceding vehicle is a requested acceleration calculated by the control apparatus of the communicating preceding vehicle on the basis of an operation amount of an acceleration operation element of the communicating preceding vehicle and an operation amount of a brake operation element of the communicating preceding vehicle.

7. The control apparatus according to claim 6, wherein when the control apparatus of the communicating preceding vehicle executes the control to cause the communicating preceding vehicle to travel following the vehicle traveling in front of the communicating preceding vehicle, the requested acceleration of the communicating preceding vehicle is a requested acceleration of the communicating preceding vehicle calculated by the control apparatus of the communicating preceding vehicle on the basis of acceleration information on an acceleration of the vehicle traveling in front of the communicating preceding vehicle acquired from the vehicle traveling in front of the communicating preceding vehicle through the wireless communication by the control apparatus of the communicating preceding vehicle.

8. The control apparatus according to claim 5, wherein the vehicle travel stabilization control includes at least one of:

a control to adjust a friction braking force applied to at least one of the vehicle wheels of the communicating preceding vehicle determined as a vehicle wheel locked during a braking of the communication preceding vehicle to eliminate a locked state of the vehicle wheel;

a control to apply the friction braking force to at least one of driving wheels of the communicating preceding vehicle determined as a driving wheel slipped during an acceleration of the communicating preceding vehicle to eliminate a slipped state of the driving wheel; and a control to apply the friction braking force to at least one of the vehicle wheels of the communicating preceding vehicle to eliminate a sidesliped state of the communicating preceding vehicle determined to be generated during a turning travel of the communicating preceding vehicle.

* * * * *